United States Patent [19]

Young

[11] 4,212,195
[45] Jul. 15, 1980

[54] SYSTEM TO MEASURE FUEL CONSUMPTION OF A VEHICLE

[76] Inventor: Michael R. Young, 5808 Ramblewood, Brighton, Mich. 48116

[21] Appl. No.: 927,178

[22] Filed: Aug. 30, 1978

[51] Int. Cl.² ............................................. G01F 9/02
[52] U.S. Cl. ...................................... 73/114; 364/442
[58] Field of Search .................. 73/114, 113; 364/442; 235/92 FL

[56] References Cited

U.S. PATENT DOCUMENTS

| | | | |
|---|---|---|---|
| 3,908,451 | 9/1975 | Walker et al. | 73/114 |
| 3,967,097 | 6/1976 | Moretti | 73/114 X |

Primary Examiner—Jerry W. Myracle

[57] ABSTRACT

A visual indicating system for displaying within a vehicle distance traveled per quantity of fuel used by the vehicle's liquid fuel consuming engine. The system includes a fuel quantity and a distance traveled transducer each of which feeds electrical signals to a computer. The computer calculates a value of distance traveled per quantity of fuel used and records the calculated value a number of times n, adds the total number of values recorded and divides by n. The number 5 is chosen as an ideal value for n. The quotient is then visually displayed. The computer continues to calculate new values of distance traveled per quantity of fuel used. After each new calculation (when 5 is used for n) 4 displayed values are added to the new calculated value, the sum is divided by 5 and the quotient is visually displayed. This may also be done by storing all the inputs n in a single register with the new value added to the register and the most recently displayed value subtracted from the register and then divide the total value in the register by n to acquire a new value for display. Various other modifications and methods are disclosed.

20 Claims, 5 Drawing Figures

SYSTEM TO MEASURE FUEL CONSUMPTION OF A VEHICLE

In U.S. Pat. No. 4,020,683 Applicant disclosed and claimed a unique valve to accurately measure the volume of a liquid flowing through a passage. The patent further discloses and claims the use of that valve employed in a measuring system of a vehicle driven by a liquid fuel consuming engine. The system provides a detectable readout of the distance traveled by the vehicle per volume of fuel consumed by the engine (miles per gallon).

Certain improvements to the original system have been subsequently developed by the Applicant. In general, these improvements can be categorized as:

(1) Major modifications to the original instantaneous averaging system, and (2) Added features which greatly expand the system's usefulness and versatility. In the text which follows, the basic system function is summarized prior to the detailed review of the major modifications and added features.

FIGS. 1 to 5 are similar to FIGS. 1 to 5 of U.S. Pat. No. 4,020,683 issued on May 3, 1977 and made a part of this application by reference. Generally the operation of the system of FIGS. 1 to 5 is as described in the following.

Figure 3:
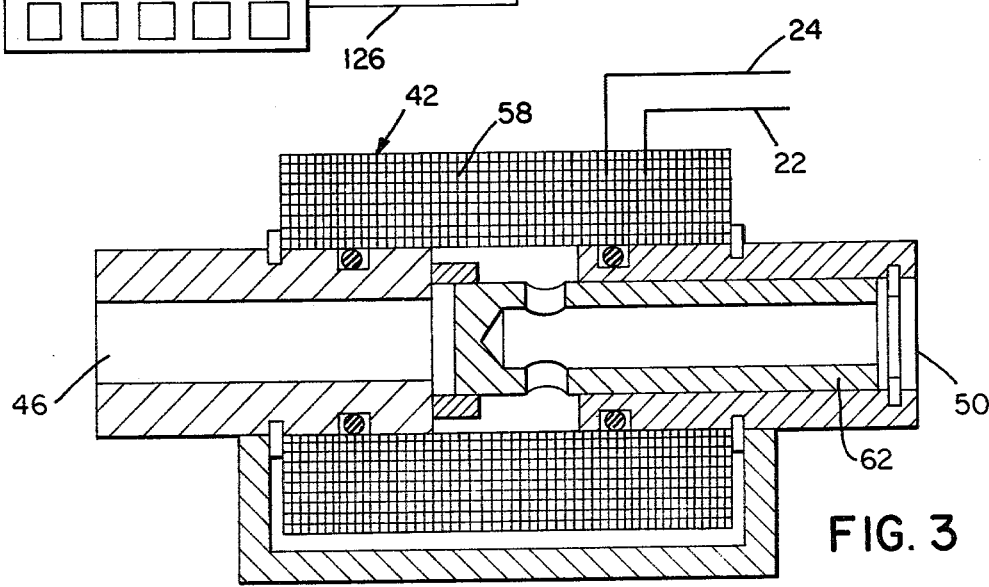
FIG. 3 is a side elevational view of the solenoid valve of the transducer of FIG. 2.
Figure 4:
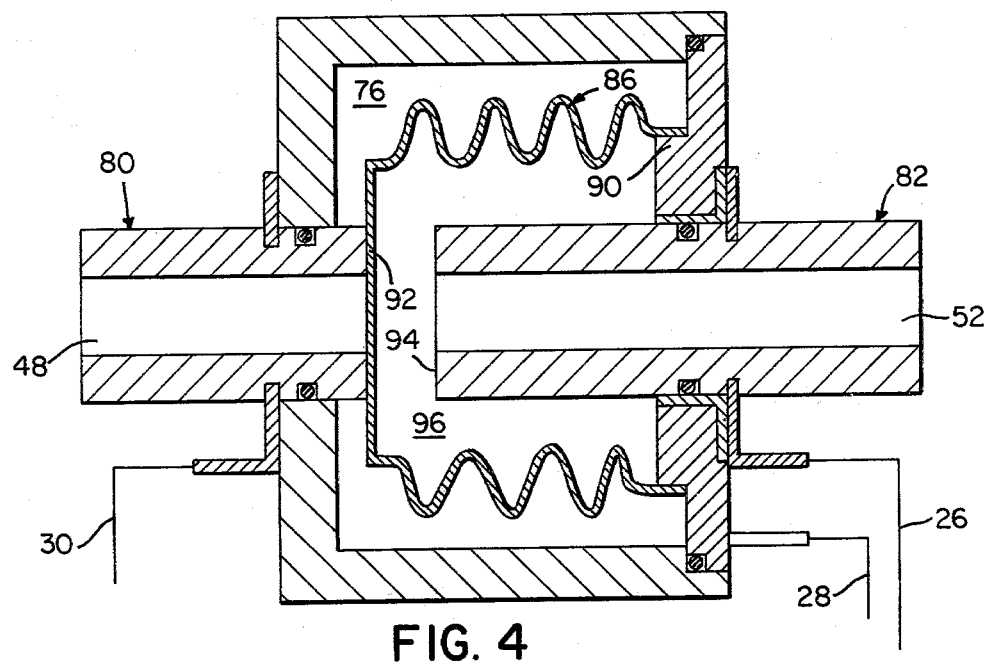
FIG. 4 is a side elevational view of the measuring bellows of the transducer of FIG. 2.
Figure 5:
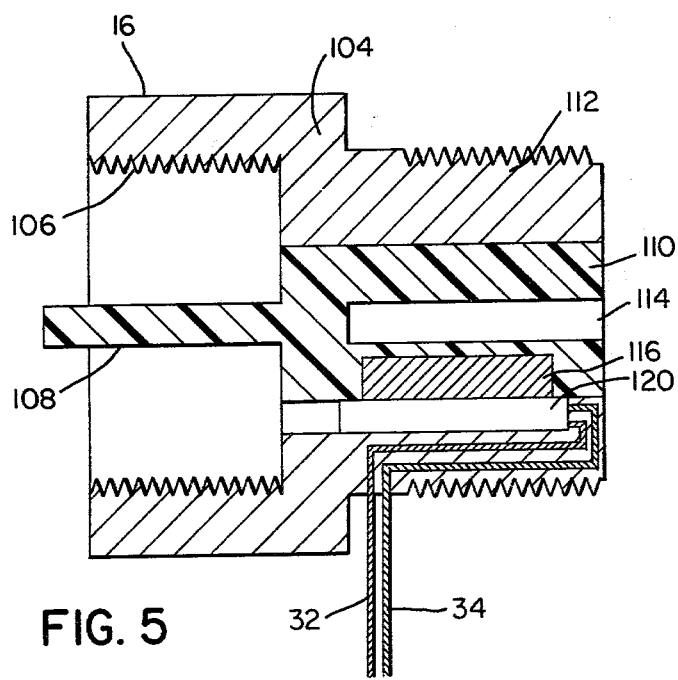
FIG. 5 is a side elevational view of the distance traveled transducer.

Logic circuit 20 energizes coil 58 via an electrical signal on lines 22 and 24 to move piston 62 to the block position illustrated in FIG. 3. It is assumed that fluid is flowing from passage 12 to passage 14 prior to energization of coil 58. Further, it is assumed that chambers 76 and 96 are filled with fluid. The fluid in chamber 45 not being able to flow through blocked passage 46 flows into passage 48, forcing an equal amount of fluid out of chamber 96 via passage 52 to chamber 49 and hence into passage 14. Upon contact of end 88 of bellows 86 with end 94 of conduit 82 an electrical signal is sent via lines 26 and 28 to logic circuit 20, and coil 58 is de-energized opening passage 46. Fluid then flows from passage 46 to passage 50. Bellows 86 under its own force returns to the position illustrated in FIG. 4, forcing fluid out of chamber 76 to passage 46, while fluid from passage 50 goes both to passage 14 and to chamber 96. Upon contact of end 88 of bellows 86 with end 92 of conduit 80 another electrical signal is sent via lines 28 and 30 to logic circuit 20, and coil 58 is again energized to move piston 62 to the blocking position illustrated in FIG. 3. The described cycle continues to repeat itself until the system is turned off. By knowing the total effective area of bellows 86 and the amount of its movement from one position to another, the precise amount of fluid flowing through fluid flow transducer 10 on each cycle can be determined. This will be discussed in greater detail later in the description.

Speed sensor 16 comprises a non-magnetic body 104 having an internal thread 106 to be threadedly engaged with an external thread on the speedometer boss of the automobile transmission once the speedometer cable has been unthreaded and removed from the boss. A square shaft 108 extends from a rotor 110 rotatably mounted in body 104 and fits into a square hole located in the rotating member within the transmission boss. External threads 112 on body 104 are provided to be threaded into the female threads of the speedometer cable and a square hole 114 is provided in rotor 110 for engagement with the square shaft within the speedometer cable. Rotor 110, therefore, rotates in a 1:1 relationship with the speedometer cable of the automobile.

Figure 2:
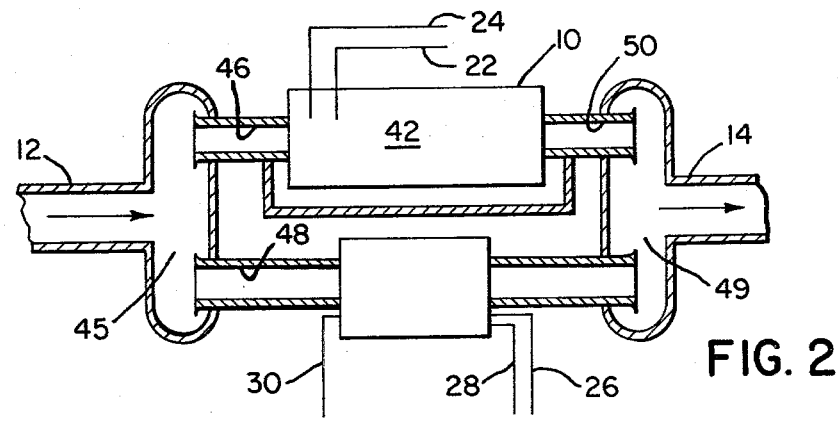
FIG. 2 is a schematic view of a fuel flow transducer.
Figure 1:
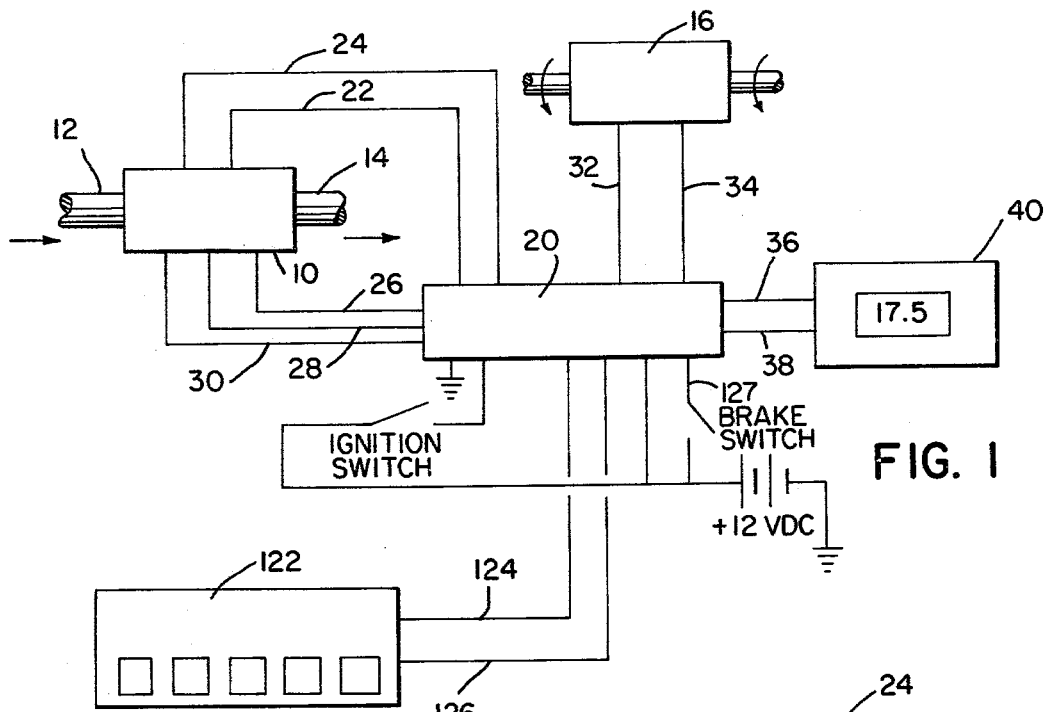
FIG. 1 is a schematic view of a system for visually indicating distance traveled per quantity of fuel used.

Rotor 110 includes a permanent magnet 116 mounted near its outer circumference. Adjacent the circumference is a reed switch 120 mounted in body 104 which closes an electrical contact each time magnet 116 is located in the position illustrated in FIG. 5. Sensing lines 32 and 34 are connected to reed switch 120 and to logic circuit 20 (FIG. 1).

Reed switch 120 opens and closes once upon each rotation of rotor 110 and sends an electrical signal representing each rotation of rotor 110 to logic circuit 20. All cars made in the United States of America are designed with the same relationship between "speedometer cable revolutions" and "indicated odometer distance." The design standard is SAE J 678, which specifies that the speedometer cable will rotate exactly 1000 times each mile. Some foreign vehicles may have a different relationship between distance traveled and cable rotation.

The calculation of miles per gallon is based upon inputs from fluid volume transducer 10 and distance traveled transducer 16. Distance traveled transducer 16 generates 1000 pulses per each mile traveled based upon the SAE J 678 standard with one pulse existing per each revolution of the speedometer cable. Fluid transducer 10 displaces a constant volume of fuel during each movement of bellows 86 between end 92 and end 94 only. This volume is $V = AbSb/231$ where Ab is the effective area of bellows 86 in square inches, Sb is the distance in inches that end 88 travels between end 92 and end 94, and V is the volume in U.S. gallons. An expression for miles per gallon can be derived where $MPG = (0.231) \times (\text{number of impulses})/(AbSb)$. If AbSb is made to equal 0.231, then MPG equals the number of pulses from distance transducer 16 between each movement of end 88 from end 92 to end 94. This can be very easily accomplished in logic circuit 20 by turning a counting register "ON" and "OFF" when the end 88 makes electrical contact with end 92 and end 94 respectively.

Logic circuit 20 comprises a function selector, a computing unit and a digital display. The computing unit is programmed to receive pulses from distance transducer 16, fuel transducer 10 and the selector 122 via lines 124 and 126 and to control the operation of coil 58 and to forward signals to the display unit 40 via lines 36 and 38.

During certain periods of vehicle operation it has been determined that the displayed values do not accurately reflect fuel consumption in a manner which is meaningful to the operator of the vehicle. Accordingly, one object of the present invention is to provide improvements to the system which will "condition" the input signals to insure that meaningful information is displayed for all operating conditions.

In a preferred embodiment logic circuit 20 has more than one register to store signals. Frequently five registers are used in circuit 20 and for the purposes of this explanation, five registers are assumed. The five registers are used to store the number of pulses which occurred during each of the five most recent bellows cycles. For example, at a given instant the registers may contain 18, 18, 18, 18 & 18 which would indicate a constant input for the previous 5 sampling periods.

During operation, logic 20 adds all of the numbers in the storage registers, divides by the number of registers, and displays the quotient. In this example the sum of all the registers is 90 which is divided by 5 to yield a quotient of 18.

Assume that during the next cycle of the bellows in flow transducer 10, 13 pulses are received from distance sensor 16. The number 13 replaces the number which is stored in the register containing the oldest information while the other four registers remain unchanged. Therefore, the registers now contain the numbers 13, 18, 18, 18 & 18. The number, which is displayed, is again the average of the numbers stored in the five registers which is 17. Assume that during the next cycle of the bellows in flow transducer 10, another 13 pulses are received from distance transducer 16. Again the number 13 replaces the information stored in the register containing the oldest information while the other four registers remain unchanged. Now the registers contain the numbers 13, 13, 18, 18 & 18. The displayed number is the average of these five numbers which is 16.

The logic continues to function in this manner. If the number 13 continues to be stored in the registers, after five cycles the displayed number will equal the most recent information received by the logic because the average of 13, 13, 13, 13 & 13 is 13. This averaging technique effectively dampens the system by reducing the rate of change of the displayed number. Furthermore, minor extraneous transient inputs caused by erratic vehicle operation usually will not affect the displayed number. For example, if the registers are, and have been receiving a constant 18 pulses but a sudden wind gust causes a change in only the next two inputs to 17, the displayed number will remain 18. That is because the rounded average of 18, 18, 18, 18 & 18 is the same as 17, 17, 18, 18 & 18. Although transient signals are usually damped from the display, the accuracy of the long term or steady state display is not compromised.

System damping as previously described can also be achieved by the following technique. The sum of all pulses received from the distance sensor during the five (or any number n) most recent cycles of bellows end 88 from end 92 to end 94 are added in a single register. The inputs from the distance sensor during the next bellows cycle is added to this register and the most recently displayed number is subtracted. This sum is then divided by 5 (or n) and the quotient is displayed. The cycle repeats itself continuously.

To allow the driver to immediately observe all major changes in fuel economy caused by rapid acceleration, or other conditions, while still allowing minor transient variations to be damped, a further modification has been incorporated. In the event that the latest input to the storage registers in the logic is considerably less than the displayed value, preferably by a factor of about 50%, then logic circuit 20 displays this new value directly while simultaneously placing it in all five registers. In effect, if the new value is less than 50% of the displayed value, then the averaging function in the logic is bypassed and the registers are all immediately updated to the new input condition. The operation then proceeds, as previously indicated, by taking the next value and substituting it for the number in the next register, averaging, and then displaying the average. This method is interpreted by Applicant as equivalent to the previously described technique of making use of registers $X_1, X_2, X_3 \ldots X_n$.

A further improvement to the system is as follows. Another signal is provided to circuit 20 via lead 127 which is connected through the brake switch to the brake lights of the vehicle. When the brakes are applied, circuit 20 clears all registers and blanks the display. Thereafter, the first value received by the logic is placed in only the first of five registers with zero value being placed in the remaining four registers. The operation of the system continues, as previously indicated, and the value in the first register is averaged with four zeros and the quotient is displayed. The next value received by the logic replaces the zero in the next register and the cycle continues. After five cycles all zeros have been replaced in the registers.

In effect, this improvement to the system would seem to create an artificially low displayed signal immediately after a brake application. This artificial signal has been found, however, to closely approximate actual fuel usage during initial acceleration after a brake application because the vehicle's fuel system in reality is slow to respond to the increased fuel flow rate. If the displayed value is not modified after a brake application, the displayed value will initially appear abnormally high and will steadily decrease over several cycles until system lag time has been overcome.

In all of the foregoing operations, the fluid value 10 continues to operate in a normal manner. The purpose of the foregoing modifications is to insure that the operator is receiving MPG values on indicator 40, which, as closely as possible, accurately reflect fuel consumption while simultaneously eliminating useless information which might tend to lead to confusion. Applicant has determined that this can best be accomplished in the manner indicated and not by displaying actual values received from transducers 10 and 16. Accordingly, Applicant is seeking patent coverage to the system disclosed, operating in the manner which was discovered as the most accurate way of displaying MPG to the operator.

In one logic embodiment, a microprocessor is utilized to process the input signals. The very powerful nature of a microprocessor allows additional information to be computed at almost no increase in system cost. Accordingly, the logic can be modified to compute and display the following information after a selector button or switch has been pushed on selector 122.

o Instantaneous MPG average
o Distance traveled during any interval
o Fuel consumed during any interval
o MPG average during any interval
o Fuel remaining/miles to empty
o Clock/elapsed time indicator
o Vehicle speed
o Other vehicle or instrumentation functions The ability to display instantaneous MPG average has been described in detail in U.S. Pat. No. 4,020,683 and previously in this document. Several of these additional functions are described in the following.

Since distance sensor 16 sends one pulse to the logic for every 1/1000 of a mile, total distance traveled during any interval can be computed by simply adding all pulses together in a register and displaying the total with the proper placement of the decimal point. This indicates actual miles traveled by the vehicle since pressing a "key" button on selector 122 which cleared the storage register on the onset.

Actual gallons of fuel consumed can also be displayed through the aid of logic circuit 20. Each cycle of bellows 86 from end 92 to end 94 displaces exactly 0.231 in$^3$ of fuel which is exactly 1/1000 of a gallon. If flow to the carburetor was not allowed from passage 46 to passage 50 in FIG. 3 when coil 58 was de-energized, then total fuel consumed by the vehicle during any interval would simply be the total of all bellows movements. However, flow is allowed during this period, and, therefore, appropriate measures must be taken to account for this variable amount. As a point of information, flow through the solenoid valve 42 during de-energization typically accounts for about 5–10% of total fuel flow through the valve.

The rate of fuel consumption by the vehicle will not noticeably change during one complete energization and de-energization cycle. Therefore, the total fuel consumed for one complete energization and de-energization cycle is very closely approximated by: In the logic, registers are required to:

(1) store total distance traveled,
(2) store total distance traveled only while the solenoid is energized, and
(3) store the total number of bellow movements from end 92 to end 94.

MPG average during any interval is easily computed by the simple division of distance traveled and total fuel consumed. Both of these quantities are determined as previously mentioned and the computation is performed once for every movement of the bellows from end 92 to end 94.

By having a timing function in logic circuit 20, the time of day can be displayed to further enhance the usefulness of this device. In addition:

(1) elapsed time can be recorded for any interval, (2) vehicle speed can be computed and displayed by using quantities already stored in the circuit, (3) miles to empty can be computed and displayed, and (4) many other useful calculations can be made by combining the known quantities of distance, volume of fuel, and time. These other variations will not be discussed since they are believed to be obvious variations to the foregoing descriptions to those skilled in the art.

What is claimed is:

1. A system for visually indicating on a display within a vehicle employing a liquid fuel consuming engine and road engaging propelling members the approximate distance traveled per quantity of fuel used by the vehicle, said system comprising:
   A. display means for visually indicating a given numerical value in response to an electrical input having a given characteristic;
   B. first transducer means for converting a given distance traveled by said vehicle into a first electrical output pulse having a given characteristic;
   C. second transducer means for converting a given amount of fuel used by said engine into a second electrical output pulse having a given characteristic; and
   D. computer means connected to receive the electrical outputs of said first and said second transducer means and to transmit an electrical input to said display means, said computer means being operable to:

1. count the total number of first pulses for a given number of second pulses, then calculate a distance traveled per quantity of fuel used value, then place said value a given number of times N in a register, then divide the total value in the register by n to determine a quotient, said n being equal to or greater than N, then forward said quotient to said display means via an electrical input to visually indicate said quotient; then
   2. count another total number of first pulses for said given number of second pulses, then calculate another distance traveled per quantity of fuel used value, then add said other value to the register and subtract the displayed value from the register, then divide said new value of the register by n to determine a new quotient, then forward said new quotient to said display means via another electrical input to visually indicate said new quotient; and then
   3. continue repeating the actions of paragraph D2.

2. A system according to claim 1 wherein when the calculated distance traveled per quantity of fuel used value is less than the displayed distance traveled per quantity of fuel used value by a factor of Y, then said computer means shall immediately display said new calculated value and place said new calculated value a given number of times n in said register and continue calculating and displaying according to the actions of paragraph D2 of claim 1.

3. A system according to claim 2 wherein Y is equal to 50%.

4. A system according to claim 1 further comprising:
   E. brake means to retard said vehicle and being electrically connected to said computer means; and wherein
   F. said computer means sends an electrical input to said display means to clear any visual indication therein and simultaneously therewith clear said register.

5. A system according to claim 4 wherein said computer means after receiving said input from said brake means being operable to count a total number of first pulses for a given number of second pulses, then calculate a distance traveled per quantity of fuel used value, then places said calculated value into said register N times, then add the total value of the register and divide said total value by n to determine a quotient, then forward said quotient to said display means via an electrical input to visually indicate said quotient, and then continue repeating the actions of paragraph D2 of claim 1.

6. A system according to claim 1 wherein:
   E. said first pulse represents 1/1000 of a given unit of distance traveled by said vehicle, and
   F. said second pulse represents 1/1000 of a given unit of fuel used by said engine.

7. A system according to claim 6 wherein:
   G. said second transducer means has repeating intervals of operation,
   H. said second pulse represents an accurate quantity of fuel used by said engine only over a portion of each of said intervals of operation of said second transducer means,
   I. said computer means records all of said first pulses,
   J. said computer means records all of said first pulses that occur when said second transducer means is measuring said accurate quantity of fuel, K. said computer means in response to a given signal multiplies said pulses from paragraph I times all of said second pulses and divides said value by said pulses from paragraph J to calculate a given value, and
L. said computer forwards an electrical input to said display means to visually indicate said calculated value.

8. A system according to claim 1 wherein:
E. said computer means in response to a given signal calculates the period of time between any two given second pulses,
F. said computer means divides said number of first pulses existing during said time period by said time period; and
G. said computer means forwards an electrical input to said display means to visually indicate said calculated value.

9. A system according to claims 1, 2, 4, 6 or 8 wherein n is 5.

10. A system according to claim 1 wherein said computer means in response to a given signal calculates the distance traveled per quantity of fuel used over a given period of time by dividing all of said first pulses occurring over the sum of a given series of time periods by all of said second pulses occurring during said time period, and forwards an electrical input to said display means to visually indicate said average calculated value.

11. A system according to claim 1 wherein said computer means in response to a given signal calculates a total distance traveled during a given period of time by adding all of said first pulses during said time period and forwards an electrical input to said display means to visually indicate said calculated value.

12. A system for visually indicating on a display within a vehicle employing a liquid fuel consuming engine and road engaging propelling members the approximate distance traveled per quantity of fuel used by the vehicle, said system comprising:
A. display means for visually indicating a given numerical value in response to an electrical input having a given characteristic,
B. first transducer means for converting a given distance traveled by said vehicle into a first electrical output pulse having a given characteristic,
C. second transducer means for converting a given amount of fuel used by said engine into a second electrical output pulse having a given characteristic, and
D. computer means connected to receive the electrical outputs of said first and said second transducer means and to transmit an electrical input to said display means, said computer means being operable to:
1. count the total number of first pulses for a given number of second pulses, then calculate a distance traveled per quantity of fuel used value, then place said value in one of a series of available registers X1, X2, X3 . . . Xn, then add the value of all of the registers and divide said total value by n to determine a quotient, then forward said quotient to said display means via an electrical input to visually indicate said quotient, then
2. count another total number of first pulses for said given number of second pulses, then calculate another distance traveled per quantity of fuel used value, then substitute said other value for the value appearing in the next available register, then add the value of the registers and divide said total value by n to determine a new quotient, then forward said new quotient to said display means via another electrical input to visually indicate said new quotient, and then
3. continue repeating the actions of paragraph D2 by substituting each new value for the value appearing in the next register until the value in register Xn is substituted for, and then continue repeating the actions of paragraph D2 by substituting the next new value for the value in register X1 and continuing as indicated in paragraph D2.

13. A system according to claim 12 wherein when the calculated distance traveled per quantity of fuel used value is less than the displayed distance traveled per quantity of fuel used value by a factor of Y, then said computer means shall immediately display said new calculated value and place said new calculated value in each of said registers X1, X2, X3 . . . Xn and continue calculating and displaying according to the actions of paragraphs D2 and D3 of claim 12.

14. A system according to claim 13 wherein Y is equal to 50%.

15. A system according to claim 12 further comprising:
E. brake means to retard said vehicle and being electrically connected to said computer means, and wherein
F. said computer means sends an electrical input to said display means to clear any visual indication therein and simultaneously therewith clear all values in all of said registers.

16. A system according to claim 15 wherein said computer means after receiving said input from said brake means being operable to count a total number of first pulses for a given number of second pulses, then calculate a distance traveled per quantity of fuel used value, then places said calculated value into register X1 while placing zero values in registers X2, X3 . . . Xn, then add the value of all of the registers and divide said total value by n to determine a quotient, then forward said quotient to said display means via an electrical input to visually indicate said quotient, and then continue repeating the actions of paragraphs D2 and D3 of claim 1.

17. A system according to claim 12 wherein:
E. said first pulse represents 1/1000 of a given unit of distance traveled by said vehicle, and
F. said second pulse represents 1/1000 of a given unit of fuel used by said engine.

18. A system according to claim 17 wherein:
G. said second transducer means has repeating intervals of operation; and
H. said second pulses represents an accurate quantity of fuel used by said engine over only a portion of each of said intervals of operation of said second transducer means;
I. said computer means records all of said first pulses,
J. said computer means records all of said first pulses that occur when said second transducer means is measuring said accurate quantity of fuel,
K. said computer means in response to a given signal multiplies said pulses from paragraph I times all of said second pulses and divides said value by said pulses from paragraph J to calculate a given value, and L. said computer forwards an electrical input to said display means to visually indicate said calculated value.

19. A system according to claim 12 wherein:
E. said computer means in response to a given signal calculates the period of time between any two given second pulses,
F. said computer means divides said number of first pulses existing during said time period by said time period, and
G. said computer means forwards an electrical input to said display means to visually indicate said calculated value.

20. A system according to claim 12, 13, 15, 17 or 19 wherein n is 5.

* * * * *